US011368569B2

(12) United States Patent
Li

(10) Patent No.: US 11,368,569 B2
(45) Date of Patent: Jun. 21, 2022

(54) TERMINAL DEVICE

(71) Applicants: BEIJING XIAOMI MOBILE SOFTWARE CO., LTD. NANJING BRANCH, Nanjing (CN); BEIJING XIAOMI MOBILE SOFTWARE CO., LTD., Beijing (CN)

(72) Inventor: Hui Li, Beijing (CN)

(73) Assignees: BEIJING XIAOMI MOBILE SOFTWARE CO., LTD. NANJING BRANCH, Nanjing (CN); BEIJING XIAOMI MOBILE SOFTWARE CO., LTD., Beijing (CN)

(*) Notice: Subject to any disclaimer, the term of this patent is extended or adjusted under 35 U.S.C. 154(b) by 223 days.

(21) Appl. No.: 16/764,152

(22) PCT Filed: Aug. 2, 2019

(86) PCT No.: PCT/CN2019/099032
§ 371 (c)(1),
(2) Date: May 14, 2020

(87) PCT Pub. No.: WO2021/022404
PCT Pub. Date: Feb. 11, 2021

(65) Prior Publication Data
US 2021/0409530 A1 Dec. 30, 2021

(51) Int. Cl.
H04M 1/02 (2006.01)
H04N 5/225 (2006.01)
(52) U.S. Cl.
CPC ........ *H04M 1/0264* (2013.01); *H04N 5/2252* (2013.01); *H04N 5/2257* (2013.01); *H04M 1/0266* (2013.01)
(58) Field of Classification Search
CPC .................................................. H04M 1/0264
See application file for complete search history.

(56) References Cited

U.S. PATENT DOCUMENTS

2006/0109198 A1* 5/2006 Chow ................... G06F 3/1438
345/1.1
2009/0061942 A1* 3/2009 Smith .................. H04B 1/3805
455/566

(Continued)

FOREIGN PATENT DOCUMENTS

CN 109905501 A 6/2019
CN 109922243 A * 6/2019

OTHER PUBLICATIONS

Partial Supplementary European Search Report in European application No. 19835225.4 dated Sep. 7, 2021.

*Primary Examiner* — Hsinchun Liao
(74) *Attorney, Agent, or Firm* — Syncoda LLC; Feng Ma

(57) ABSTRACT

A terminal device includes a first screen assembly configured to display an image and including a first opening; an image collecting assembly under the first screen assembly, configured to collect an image based on external light when the opening is not shielded; a second screen assembly configured to display an image and shield the opening, and movably disposed between the first screen assembly and the image collecting assembly; a driving assembly configured to drive the second screen assembly to move between first and second positions; at the first position, the opening is shielded and the second screen assembly is in a display state displaying an image not displayed at the opening in the first screen assembly, forming a complete image with the image displayed by the first screen assembly; at the second position, the opening is not shielded, thereby the image collecting assembly can collect the image.

20 Claims, 14 Drawing Sheets

(56) References Cited

U.S. PATENT DOCUMENTS

2020/0220957 A1   7/2020   Liu
2021/0006647 A1   1/2021   Zhao

* cited by examiner

TERMINAL DEVICE

CROSS-REFERENCE TO RELATED APPLICATION

This application is a national stage of International Application No. PCT/CN2019/099032 filed on Aug. 2, 2019, the disclosure of which is hereby incorporated by reference in its entirety.

TECHNICAL FIELD

The present disclosure generally relates generally to technology fields of electronic apparatuses, and more specifically to a terminal device.

BACKGROUND

With development of terminal technology and popularity of a smart terminal device, it is becoming a trend to dispose a camera for taking a selfie on the terminal device. However, the camera disposed on the existing terminal device occupies a certain space of a screen, which reduces a screen-to-body ratio of the terminal device. As a result, display effect of the terminal device is restricted and user experience of it is affected.

SUMMARY

The present disclosure is directed to provide a terminal device.

According to an aspect of the embodiments of the present disclosure, there is provided a terminal device, comprising at least:

a first screen assembly configured to display an image, and having a first opening;

an image collecting assembly, disposed under the first screen assembly, and configured to collect an image based on external light when the first opening is not shielded;

a second screen assembly configured to display an image and covering the first opening, and movably disposed between the first screen assembly and the image collecting assembly; and a driving assembly configured to drive the second screen assembly to move between a first position and a second position, wherein when the second screen assembly is in the first position and the first opening is shielded, the second screen assembly is in a display state and displays an image which is not displayed at the first opening in the first screen assembly, thereby forming a complete image with the image displayed by the first screen assembly; and wherein when the second screen assembly is moved to the second position, the first opening is not shielded, thereby that the image collecting assembly is capable of collecting an image.

In an embodiment, the driving assembly comprises:
a motor;
a rotation assembly coupled to the motor and configured to rotate about a rotational axis to drive the second screen assembly to move between the first position and the second position by means of the motor.

In an embodiment, the terminal device further includes:
a first connection slot connected to the second screen assembly;

wherein the rotation assembly is configured to pass through the first connection slot, and drive the second screen assembly to move through the first connection slot.

In an embodiment, the terminal device further comprises:
a movement path stop assembly, having a first stop module and a second stop module disposed opposite to the first stop module, wherein the second screen assembly is located at the first position when it is in contact with the first stop module, and the second screen assembly is located at the second position when it is in contact with the second stop module;

a rotation assembly, located on the movement path stop assembly, and capable of driving the second screen assembly to move between the first stop module and the second stop module by rotation thereof relative to the movement path stop assembly.

In an embodiment, the terminal device further comprises:
a guiding assembly fixedly coupled to the movement path stop assembly for guiding the second screen assembly to move between the first position and the second position along a setting direction of the second screen assembly.

In an embodiment, the terminal device further comprises:
a second connection slot connected to the second screen assembly;

wherein the guiding assembly is configured to pass through the second connection slot to guide the second screen assembly to move in the setting direction of the second screen assembly.

In an embodiment, the terminal device further comprises:
a printed circuit board;
a flexible circuit board connected to the second screen assembly and parallel to the drive assembly;
a connection assembly connected to the flexible circuit board and the printed circuit board respectively, for outputting control signals of the printed circuit board to the flexible circuit board;

wherein the flexible circuit board is configured to control the image displayed by the second screen assembly as the image that is not displayed by the first screen assembly at the first opening, based on the control signals.

In one embodiment, the terminal device the terminal device comprises a casing in a shape of rectangle;
wherein the second screen assembly is located within the casing;
wherein the driving assembly is configured to drive the second screen assembly to move in a direction along a long side of the casing.

In one embodiment, the terminal device comprises a casing in a shape of rectangle;
wherein both the first stop module and the second stop module are disposed in the casing and parallel to a short side of the casing.

In an embodiment, the terminal device further comprises:
a transparent assembly covering a display surface of the first screen assembly, through which the first opening can be shown.

The technical solutions provided by the embodiments of the present disclosure may include the following beneficial effects.

When it is required for the image collecting assembly to collect an image, the second screen assembly is driven to move to the second position, and the image collecting assembly collects an image through the first opening, so that it is realized that the image collecting assembly smoothly complete an image collection without specifically occupying a display area of the terminal device, which increases a screen-to-body ratio and improves user experience. At the same time, when it is not required for the image collecting assembly to generate an image, the second screen assembly is driven to move to the first position, and the image displayed by the second screen assembly and the image displayed by the first screen assembly constitute a complete image. As a result, by adjusting position of the second screen assembly, on the one hand, when it is required for the user to take a selfie, the image collecting assembly may be exposed to realize the selfie, and on the other hand, when the user needs a normal display, the second screen assembly may be used to make up the first opening, so as to achieve visually a full-screen display.

It should be appreciated that the above general description and the following detailed description are intended to be illustrative and not restrictive.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
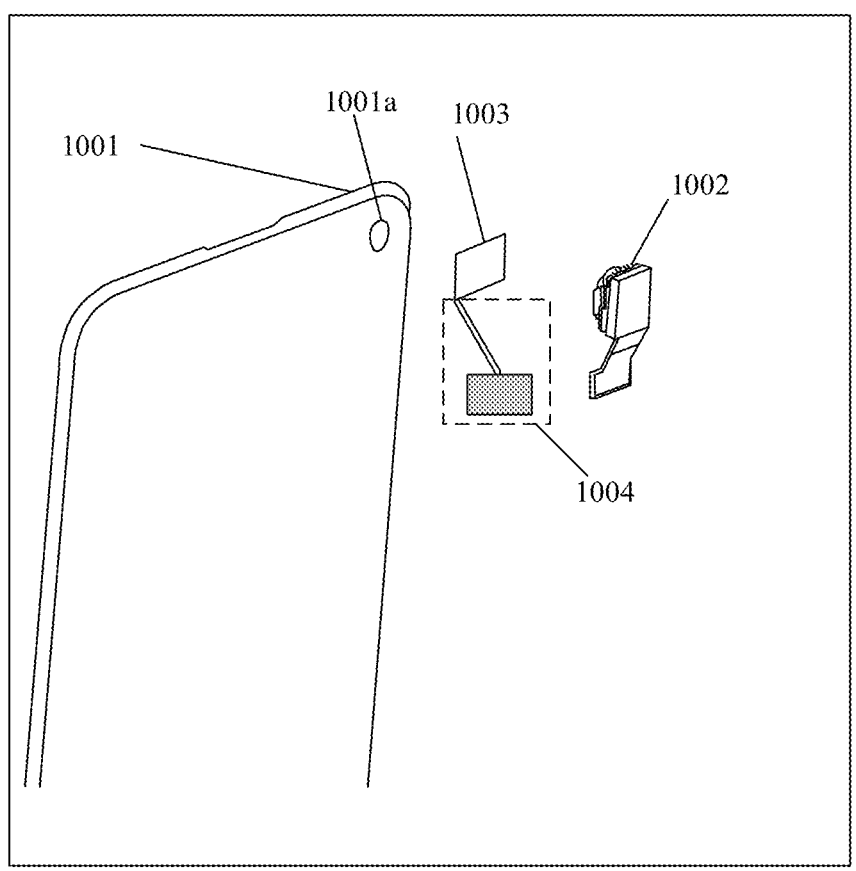
FIG. 1 is a first schematic view showing configuration of a terminal device according to an exemplary embodiment.

FIG. 1 is a first schematic view showing configuration of a terminal device according to an exemplary embodiment. As shown in FIG. 1, the terminal device at least includes:

a first screen assembly 1001 configured to display an image, wherein the first screen assembly 1001 includes a first opening 1001a;

an image collecting assembly 1002, disposed under the first screen assembly 1001, and configured to collect an image based on external light when the first opening 1001a is not shielded;

a second screen assembly 1003 configured to display an image and covering the first opening 1001a, and movably disposed between the first screen assembly 1001 and the image collecting assembly 1002; and a driving assembly 1004 configured to drive the second screen assembly 1003 to move between a first position and a second position;

wherein when the second screen assembly 1003 is in the first position, the first opening 1001a is shielded and the second screen assembly 1003 is in a display state displaying an image which is not displayed at the first opening 1001a in the first screen assembly 1001, thereby forming a complete image together with an image displayed by the first screen assembly 1001; and wherein when the second screen assembly 1003 is moved to the second position, the first opening 1001a is not shielded, thereby the image collecting assembly 1002 is capable of collecting an image.

In the embodiment of the present disclosure, the terminal device at least includes: a first screen assembly 1001, an image collecting assembly 1002, a second screen assembly 1003, and a driving assembly 1004.

Illustratively, the terminal device may be a wearable electronic apparatus and a mobile terminal, and the mobile terminal may include a mobile phone, a notebook, and a tablet, and the embodiment of the present disclosure is not limited thereto.

In the embodiment of the present disclosure, the first screen assembly 1001 is configured to display an image.

Illustratively, the first screen assembly 1001 may include a liquid crystal display and an Organic Light-Emitting Diode (OLED) display, which is not limited in the embodiment of the present disclosure.

In the embodiment of the present disclosure, a shape and a size of the first opening 1001a of the first screen assembly 1001 are adapted to those of the image collecting assembly 1002, respectively.

It may be needed to note that the shape of the first opening 1001a may be set according to the shape of the image collecting assembly 1002. For example, when the shape of the image collecting assembly 1002 is a circular, the first opening 1001a may be set in a shape of a circle. When the shape of the image collecting assembly 1002 is an ellipse, the first opening 1001a may be set in a shape of an ellipse.

Certainly, the size of the first opening 1001a may also be set according to the size of the image collecting assembly 1002. For example, the size of the image collecting assembly 1002 is set to be equal to that of the first opening 1001a.

In the embodiment of the present disclosure, the image collecting assembly 1002 collects an image based on external light when the first opening 1001a is not shielded.

Illustratively, the image collecting assembly 1002 includes a camera that is located on a surface where the first screen assembly 1001 of the terminal device is positioned.

In the embodiment of the present disclosure, the driving assembly 1004 drives the second screen assembly 1003 to move between a first position and a second position.

It may be needed to note that the first position may be set as a starting position, and the second position may be set as an ending position. Alternatively, the first position may be set as the ending position, and the second position may be set as the starting position. That is to say, the second screen assembly 1003 can be gradually moved not only from the starting position to the ending position, but also from the ending position to the starting position.

In the embodiment of the present disclosure, the second screen assembly 1003 is configured to display an image and cover the first opening 1001*a*.

It may be needed to note that the size of the second screen assembly 1003 can match that of the first opening 1001*a*. For example, the size of the second screen assembly 1003 may be set to be equal to or larger than that of the first opening 1001*a*, so as to cover the first opening 1001*a*.

In the embodiment of the present disclosure, when the first screen assembly 1001 is in the first position, the first opening 1001*a* is shielded, the second screen assembly 1003 is in a display state, and the image displayed by the second screen assembly 1003 which is an image that is not displayed by the first screen assembly 1001 at the first opening 1001*a*, forms a complete image together with the image displayed by the first screen assembly 1001.

It may be needed to note that the image displayed by the first screen assembly 1001 and the image displayed by the second screen assembly 1003 constitute the complete image, which includes: the first screen assembly 1001 and the second screen assembly 1003 are configured to display different display areas of the same image.

Illustratively, when displaying a target image, the first screen assembly 1001 displays a first area of the target image, and the second screen assembly 1003 displays a second area of the target image, wherein the first area is different from the second area.

In the embodiment of the present disclosure, the second screen assembly 1003 is movable between the first position and the second position. When the second screen assembly 1003 is moved to the second position, the first opening 1001*a* is not shielded so that the image collecting assembly 1002 is capable of collecting an image. When the second screen assembly 1003 is moved to the first position, the second screen assembly 1003 is in a display state, and the images displayed by the second screen assembly 1003 and the first screen assembly 1001 constitute the complete image.

Figure 2A:
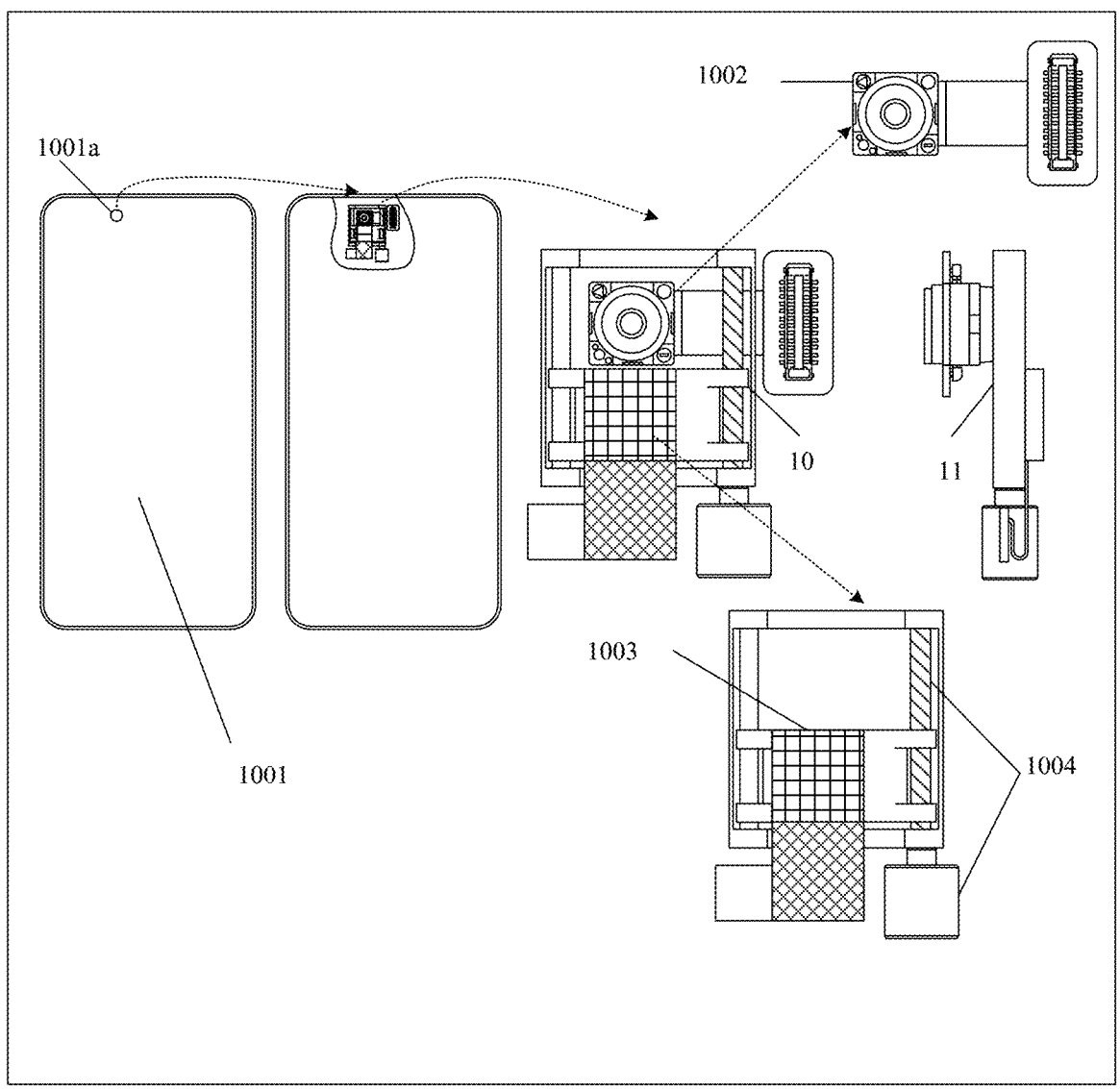
FIG. 2A is a second schematic view showing configuration of a terminal device according to an exemplary embodiment.
Figure 2B:
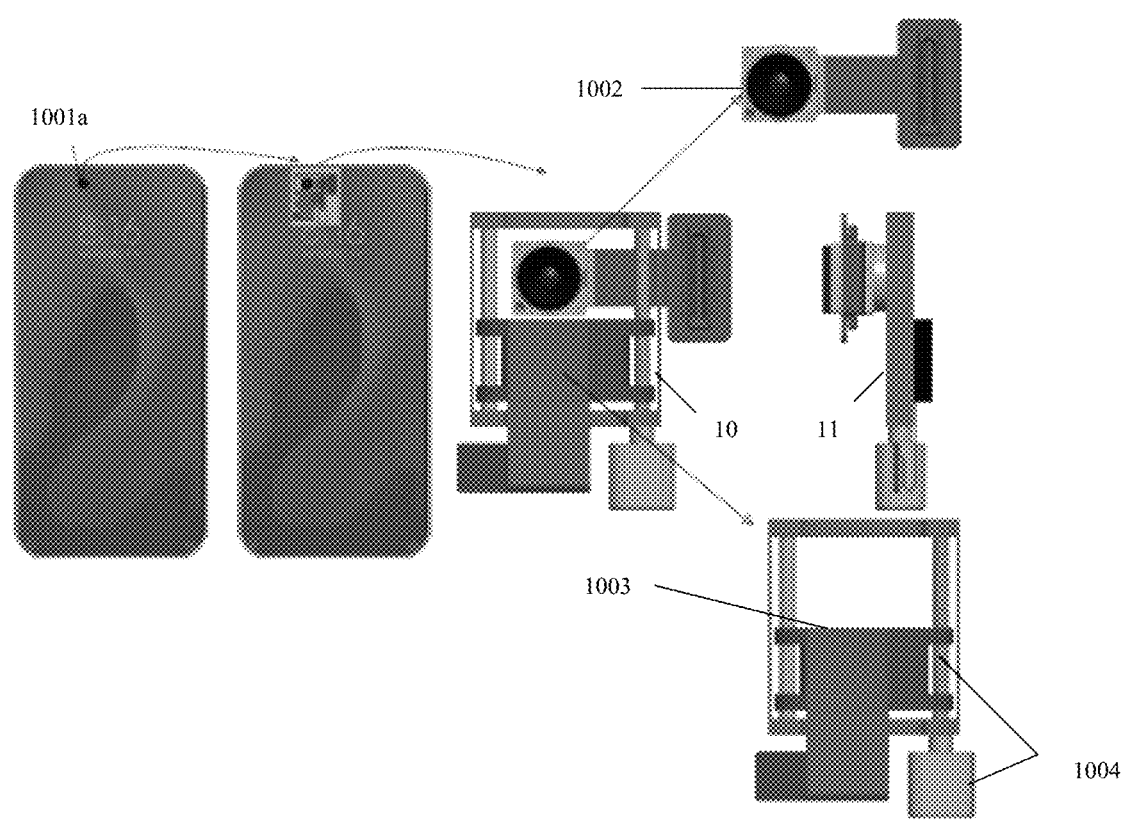
FIG. 2B is a third schematic view showing configuration of a terminal device according to an exemplary embodiment.

Illustratively, as shown in FIG. 2A and FIG. 2B, when the second screen assembly 1003 is in the second position, the second screen assembly 1003 is located behind the first screen assembly 1001, the first opening 1001*a* is not shielded, and the image collecting assembly 1002 is exposed by the first opening 1001*a*. At this time, the image can be collected by the exposed image collecting assembly 1002 so that the image collecting assembly 1002 is exposed to collect an image and then generate the image while taking a selfie. An assembly 10 in FIG. 2A and FIG. 2B comprises the image collecting assembly 1002, the second screen assembly 1003, and the driving assembly 1004. An assembly 11 is a side view of the assembly 10.

Figure 3A:
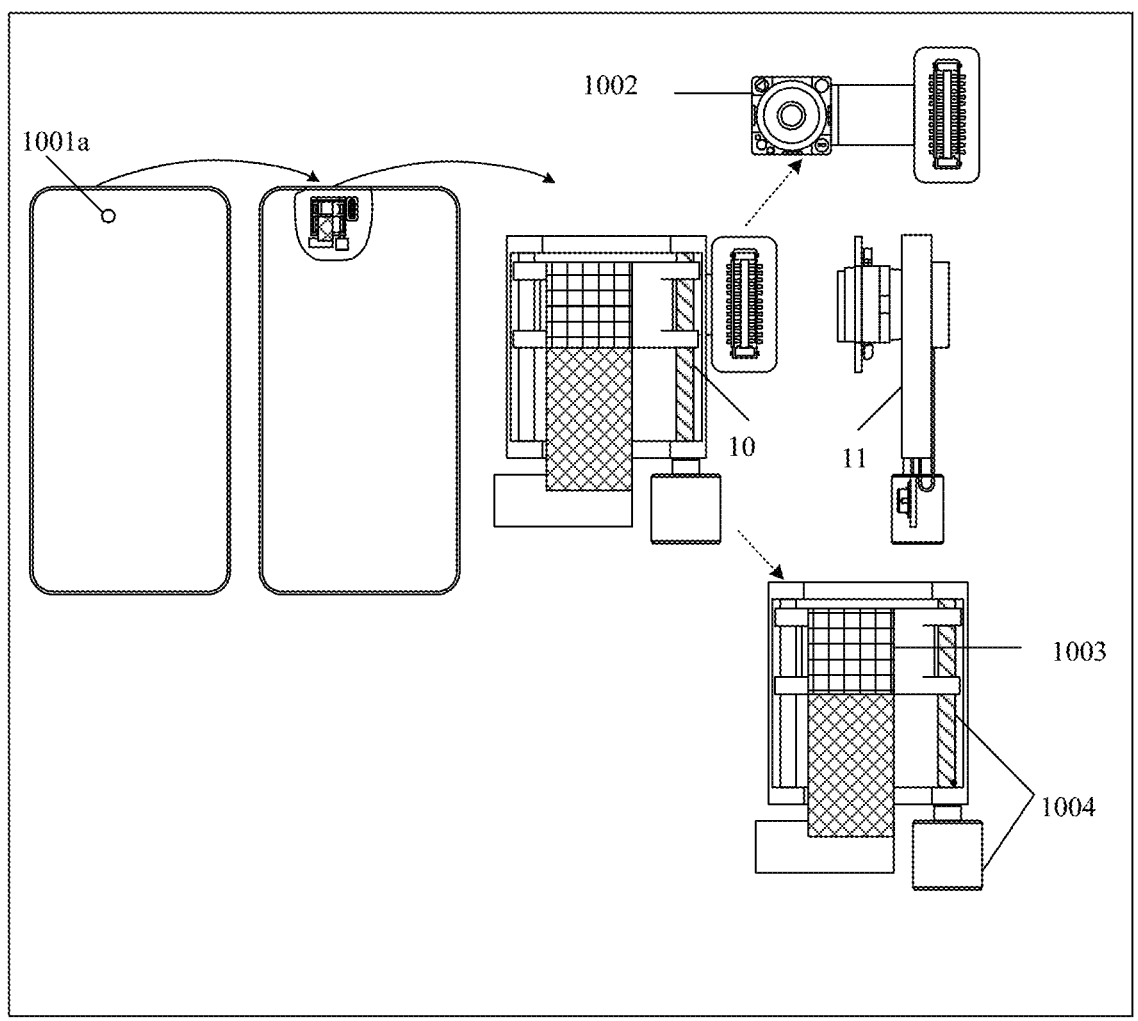
FIG. 3A is a fourth schematic view showing configuration of a terminal device according to an exemplary embodiment.
Figure 3B:
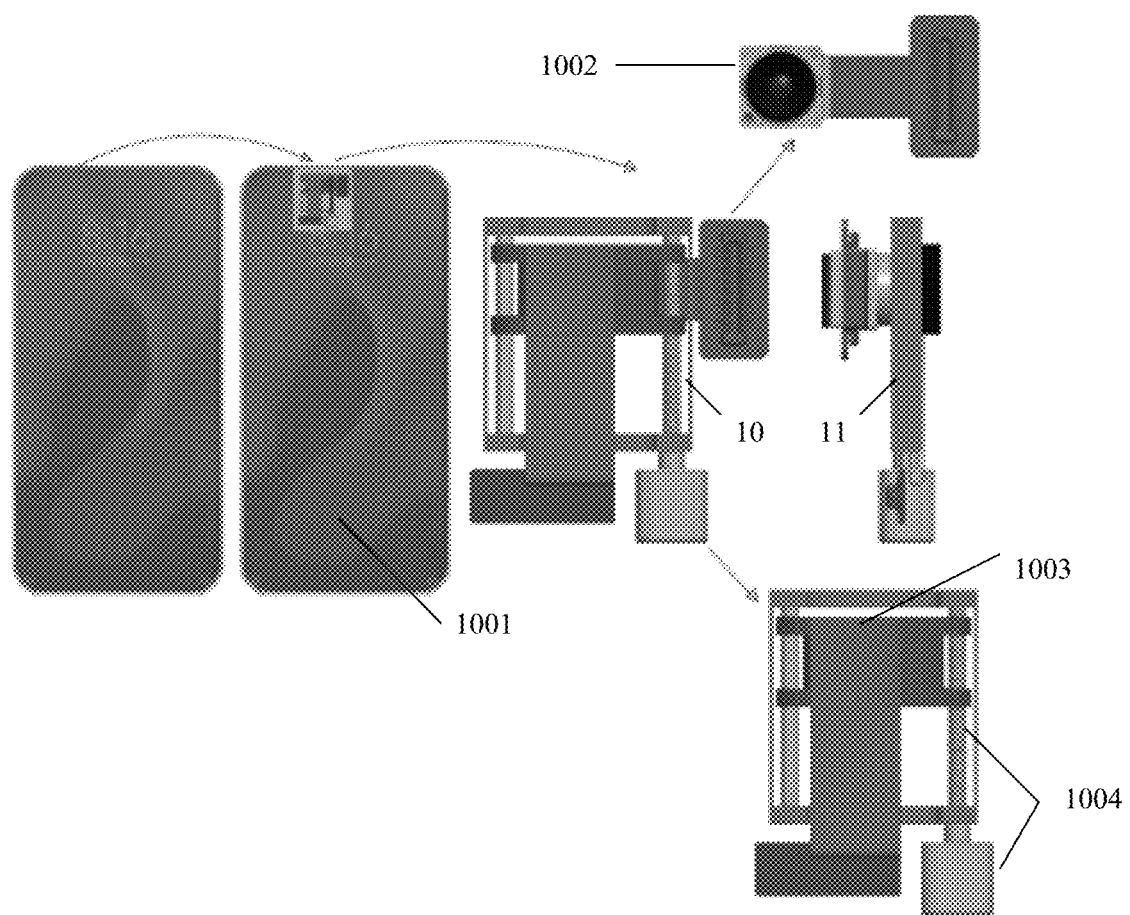
FIG. 3B is a fifth schematic view showing configuration of a terminal device according to an exemplary embodiment.

As shown in FIG. 3A and FIG. 3B, when the second screen assembly 1003 is in the first position, the second screen assembly 1003 is located between the first screen assembly 1001 and the image collecting assembly 1002 so that the second screen assembly 1003 covers the first opening 1001*a*, and is exposed through the first opening 1001*a*. At this time, the exposed second screen assembly 1003 is in a display state, and the image displayed thereof is an image that is not displayed by the first screen assembly 1001 at the first opening 1001*a*. An assembly 10 in FIG. 3A and FIG. 3B includes the image collecting assembly 1002, the second screen assembly 1003, and the driving assembly 1004. An assembly 11 is a side view of the assembly 10.

Figure 4:
FIG. 4 is a sixth schematic view showing configuration of a terminal device according to an exemplary embodiment.

During designing of an image collecting assembly 1002 of the terminal device, as shown in FIG. 4, the first screen assembly 1001 includes the first opening 1001*a*, and the image collecting assembly 1002 is located at a position on a side of the first opening 1001*a* toward inside of the terminal device so as to collect an image from external light through the first opening 1001*a*.

With respect to the terminal device of FIG. 4, since the first opening 1001*a* in the embodiment of the present disclosure is capable of both providing external light for the image collecting assembly 1002 to collect images and being shielded by the second screen assembly 1003 when it is not required to collect the images. Therefore, it is not necessary for the embodiment of the present disclosure to consider a size of the first opening 1001*a* occupying a display surface of the first screen assembly 1001, thereby reducing difficulties in dimension designing and manufacturing of the image collecting assembly 1002, while improving quality of an image and meeting aesthetic needs of users.

In addition, the image collecting assembly 1002 in the embodiment of the present disclosure is capable of collecting an image from the external light through the first opening 1001*a* when taking the selfie, and realizing that the second screen assembly 1003 covers the first opening 1001*a* and displays the image that is just not displayed by the screen assembly 1001 at the first opening 1001*a* when it is not required to collect the image. Therefore, on one hand, it can be realized that the image collecting assembly 1002 smoothly complete an image collection without specifically occupying a display area of the terminal device, thereby improving a screen-to-body ratio, and on the other hand, the image displayed by the first screen assembly 1001 can be combined with the image displayed by the second screen assembly 1003 to provide a complete image display, thereby reducing a probability of incomplete display and achieving a visual effect of full-screen display.

Figure 5A:
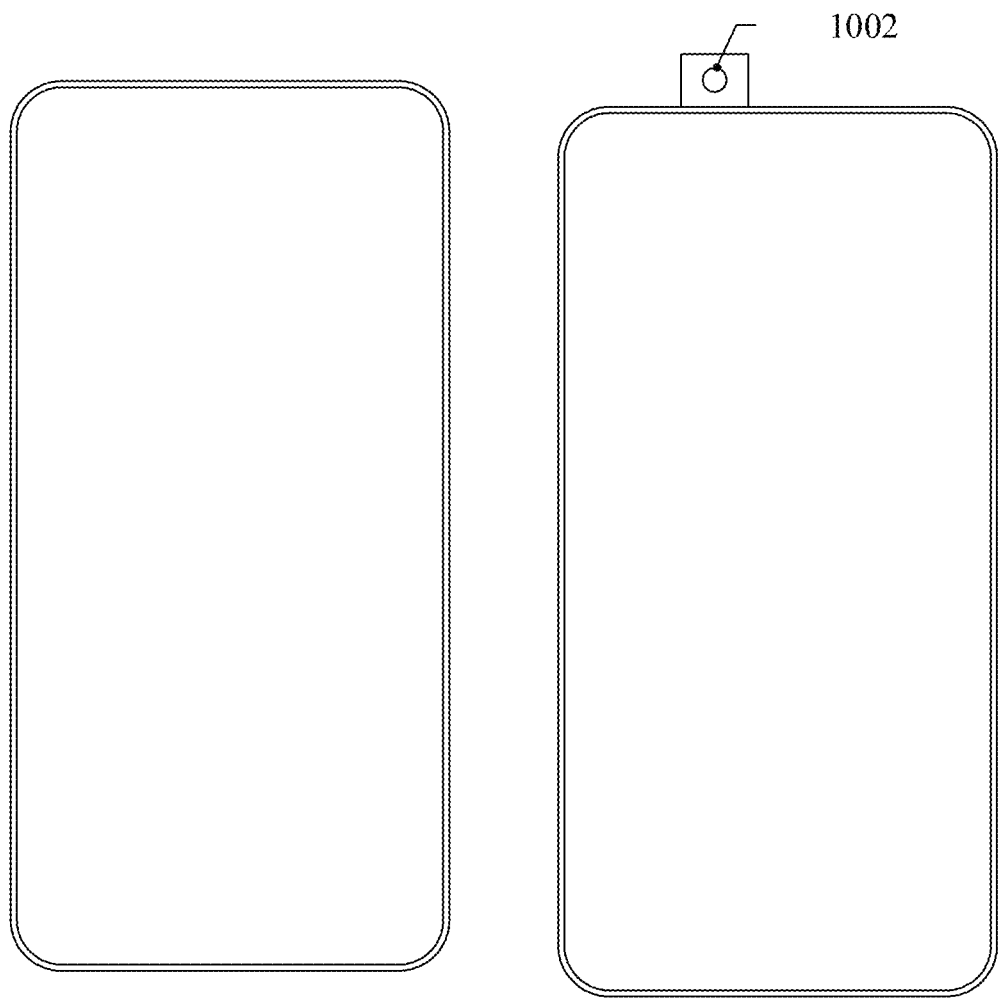
FIG. 5A is a seventh schematic view showing configuration of a terminal device according to an exemplary embodiment.
Figure 5B:
FIG. 5B is an eighth schematic view showing configuration of a terminal device according to an exemplary embodiment.

As shown in FIG. 5A and FIG. 5B, an image collecting assembly 1002 is configured as a pop-up image collecting assembly. When it is required for the image collecting assembly 1002 to collect an image, the image collecting assembly 1002 is driven to move outside of the terminal device. When it is not required for the image collecting assembly 1002 to collect an image, the image collecting assembly 1002 is driven to move inside of the terminal device from outside thereof.

With respect to FIG. 5A and FIG. 5B, the image collecting assembly 1002 in the embodiment of the present disclosure is not always moved to outside of the terminal device, but is normally located inside of the terminal device together with other assemblies such as the second screen assembly 1003 and the driving assembly 1004, etc. Therefore, by implementing the embodiments of the present disclosure, probability of dust and water entering the terminal device may be reduced, thereby improving anti-dust and waterproof level of the terminal device. At the same time, a problem of poor reliability caused by falling of the image collecting assembly 1002 being located outside the terminal device is resolved, thereby improving the reliability of the terminal device.

Figure 6:
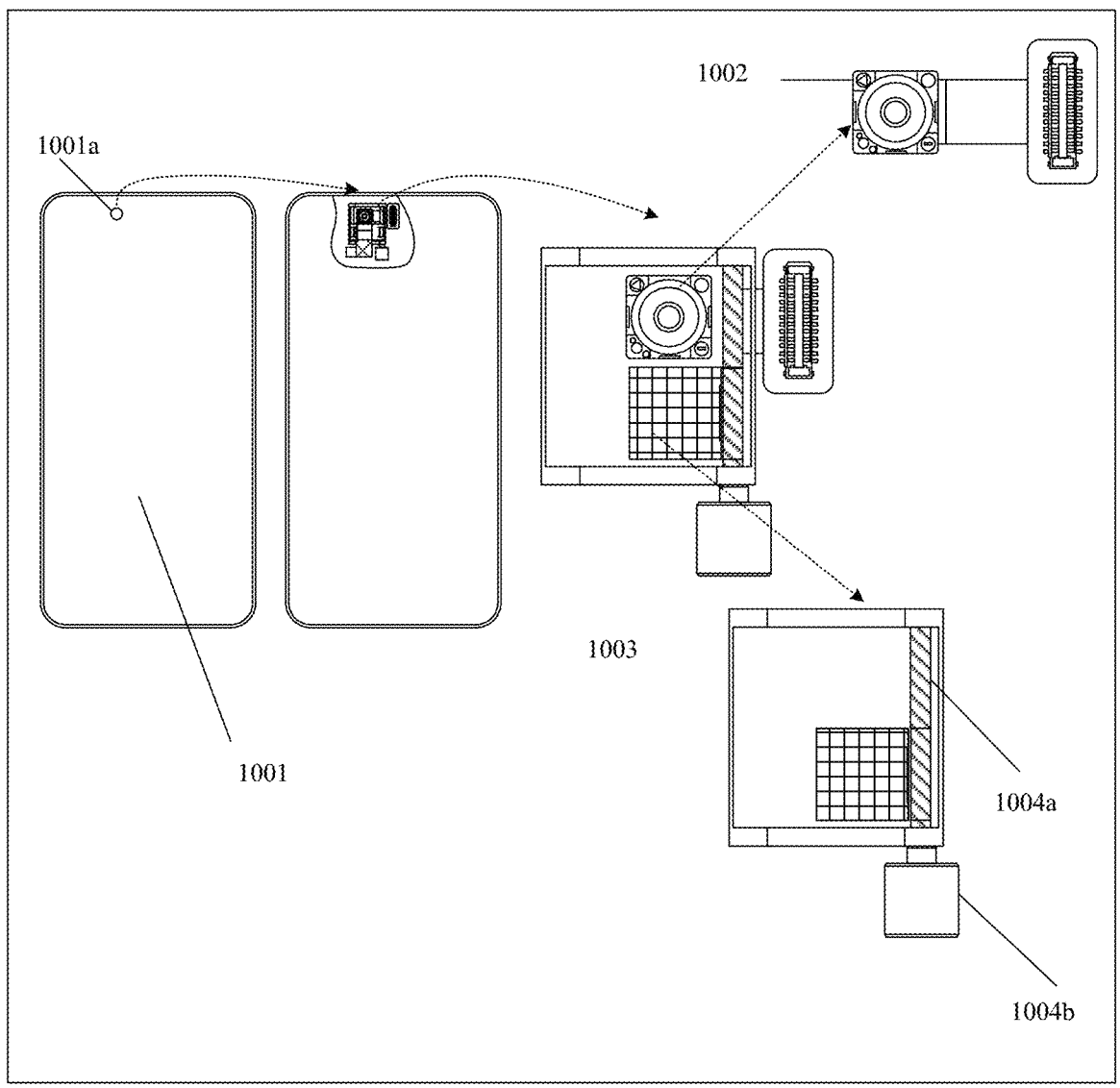
FIG. 6 is a ninth schematic view showing configuration of a terminal device according to an exemplary embodiment.

In an embodiment, FIG. 6 is a ninth schematic view showing configuration of a terminal device according to an exemplary embodiment. As shown in FIG. 6, the driving assembly 1004 includes:

a motor 1004*b*;

a rotation assembly 1004*a*, coupled to the motor 1004*b* and rotating about a rotational axis to drive the second screen assembly 1003 to move between the first position and the second position by means of the motor 1004*b*.

In the embodiment of the present disclosure, the motor 1004*b* is capable of generating a rotational force in two opposite directions.

Illustratively, the motor 1004*b* may be a DC motor, an asynchronous motor, or a synchronous motor, which is not limited in the embodiment of the present disclosure.

In the embodiment of the present disclosure, the rotation assembly 1004*a* can be rotated in two opposite directions about the axis by means of the rotational force generated by the motor 1004*b*, thereby enabling the second screen assembly 1003 to move between the first position and the second position.

It may be needed to note that when collecting the image, that is, taking a selfie, the rotation assembly 1004*a* rotates toward a first direction to drive the second screen assembly 1003 to move from the first position to the second position; when not collecting the image, the rotation assembly 1004*a* rotates toward a second direction opposite to the first direction, to drive the second screen assembly 1003 to move from the second position to the first position.

Figure 7:
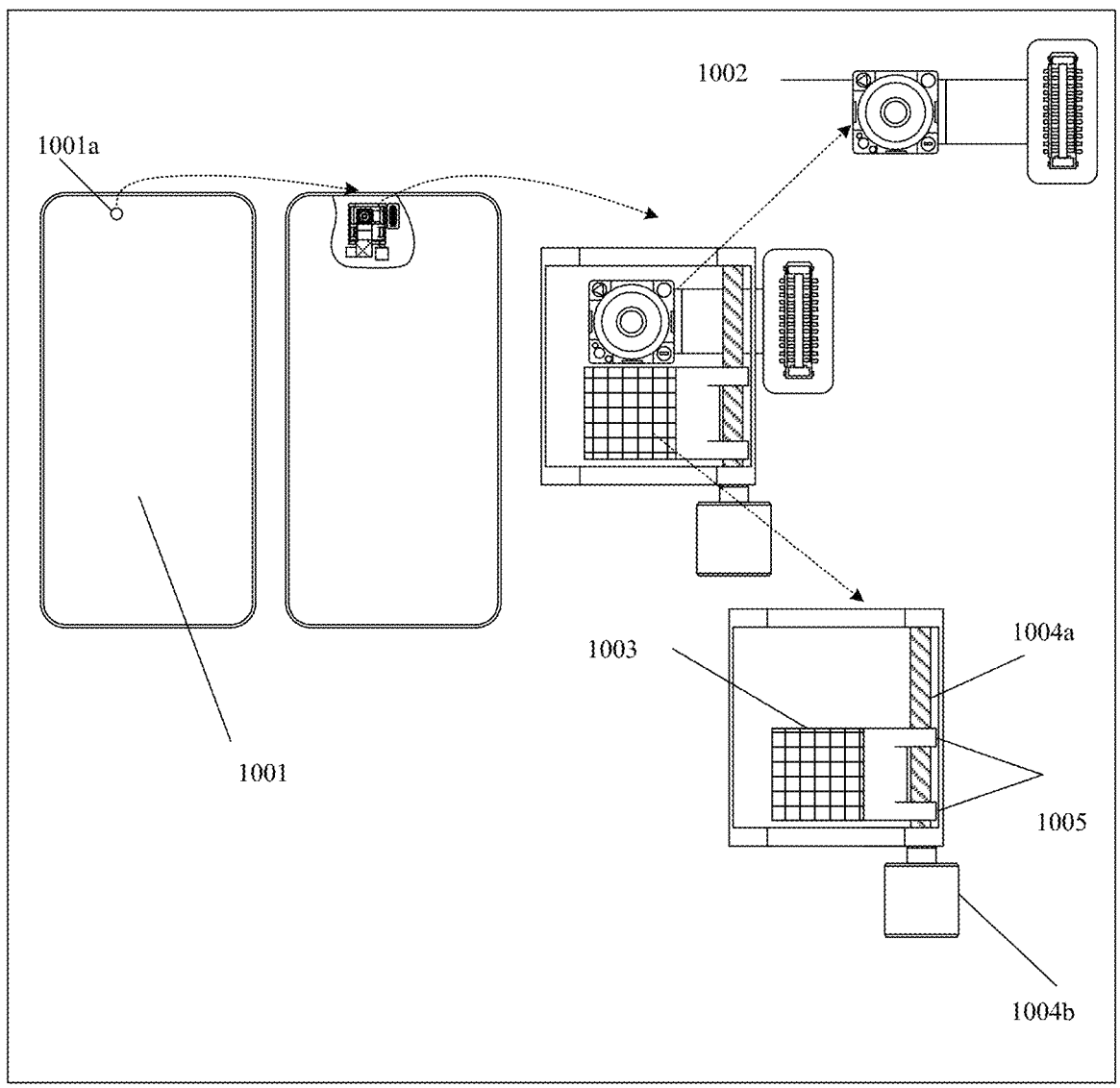
FIG. 7 is a tenth schematic view showing configuration of a terminal device according to an exemplary embodiment.

In an embodiment, as shown in FIG. 7, the terminal device may further include:

a first connection slot 1005 connected to the second screen assembly 1003;

a rotation assembly 1004*a* passing through the first connection slot 1005, and driving the second screen assembly 1003 to move through the first connection slot 1005.

It may be needed to note that when the rotation assembly 1004*a* is rotated toward two opposite directions, a force acting on the first connection slot 1005 is generated. By this force, the second screen assembly 1003 connected to the first connection slot 1005 is movable between a position and a second position.

Figure 8:
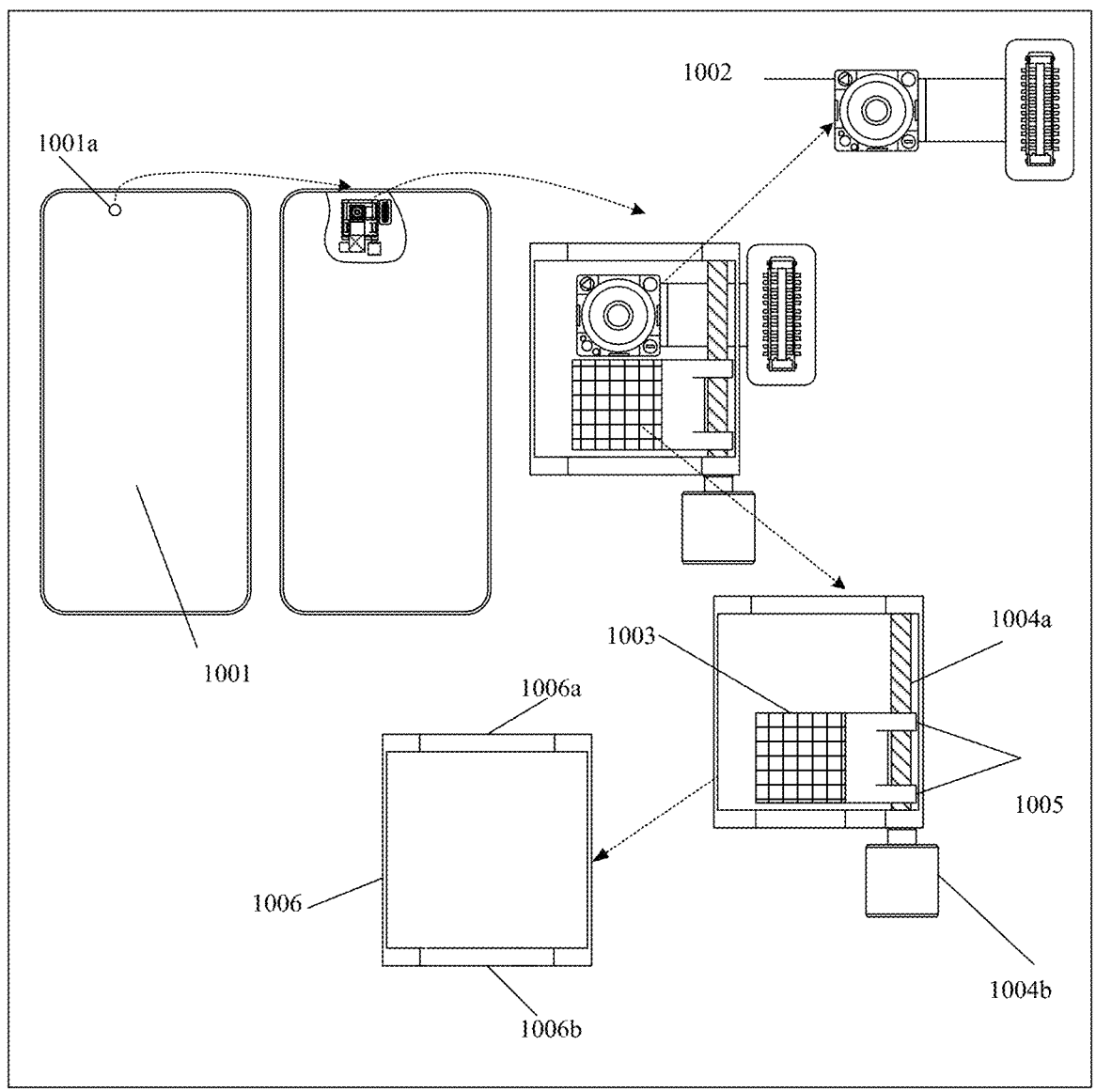
FIG. 8 is an eleventh schematic view showing configuration of a terminal device according to an exemplary embodiment.

In an embodiment, as shown in FIG. 8, the terminal device may further include:

a movement path stop assembly 1006, comprising a first stop module 1006*a* and a second stop module 1006*b* disposed opposite to the first stop module 1006*a*, wherein the second screen assembly 1003 is located at a first position when it is in contact with the first stop module 1006*a*, and the second screen assembly 1003 is located at a second position when it is in contact with the second stop module 1006*b*;

a rotation assembly 1004*a*, located on the movement path stop assembly 1006, and capable of driving the second screen assembly 1003 to move between the first stop module 1006*a* and the second stop module 1006*b* by rotation thereof relative to the movement path stop assembly 1006.

In an embodiment as shown in FIG. 8, the terminal device may include a casing in a shape of rectangle; and both the first stop module 1006*a* and the second stop module 1006*b* are disposed in the casing and parallel to a short side of the casing.

In an embodiment as shown in FIG. 8, the terminal device may include a casing in a shape of rectangle;

the second screen assembly 1003 is located within the casing; and the driving assembly 1004 is configured to drive the second screen assembly 1003 to move in a direction along a long side of the casing.

Figure 9:
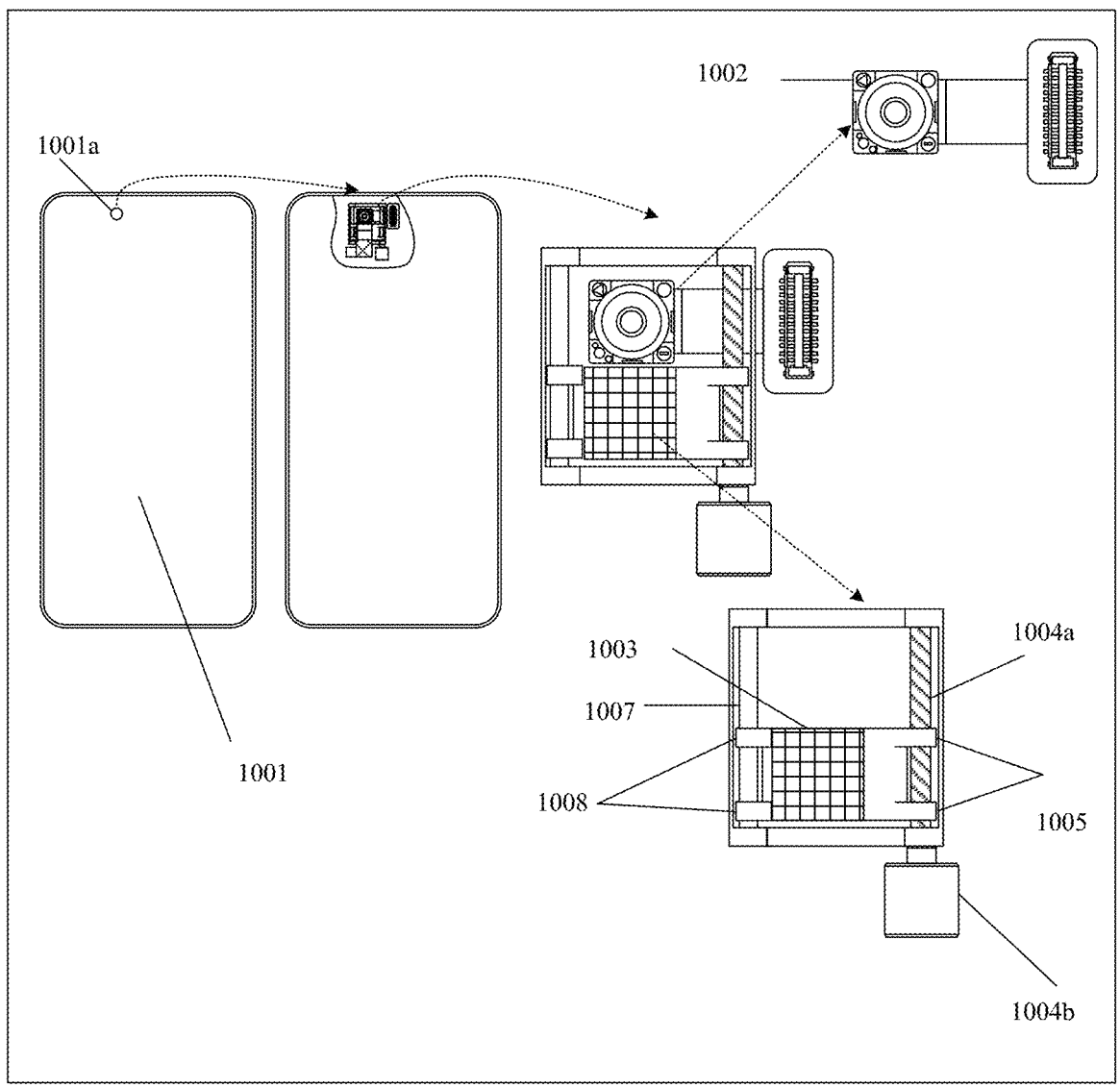
FIG. 9 is a twelfth schematic view showing configuration of a terminal device according to an exemplary embodiment.

In an embodiment as shown in FIG. 9, the terminal device may further include:

a guiding assembly 1007 fixedly coupled to the movement path stop assembly 1006 for guiding the second screen assembly 1003 to move between the first position and the second position along a setting direction of the second screen assembly 1007.

In an embodiment as shown in FIG. 9, the terminal device may further include:

a second connection slot 1008 connected to the second screen assembly 1003;

a guiding assembly 1007 passing through the second connection slot 1008 to guide the second screen assembly 1003 to move in a setting direction of the second screen assembly 1007.

It could be appreciated that, by the cooperation of the guiding assembly 1007 and the rotation assembly 1004*a*, the second screen assembly 1003 is movable between the first position and the second position. As a result, it can be realized that the image collecting assembly 1002 smoothly complete an image collection without specifically occupying a display area of the terminal device. The first opening 1001*a* is shielded by the second screen assembly 1003 when it is required to normally display so as to achieve a visual effect of full-screen display.

Figure 10:
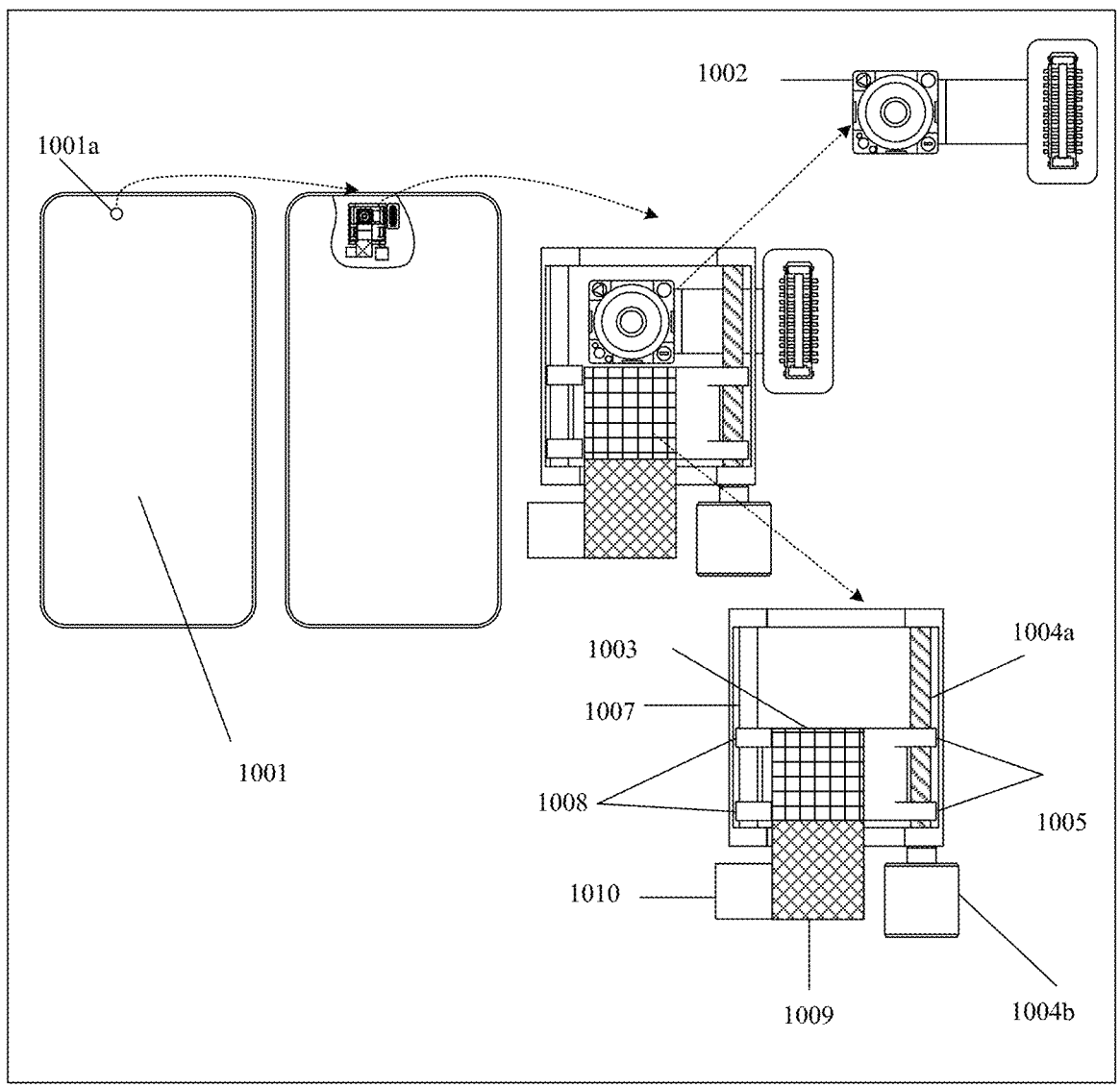
FIG. 10 is a thirteenth schematic view showing configuration of a terminal device according to an exemplary embodiment.

In an embodiment, as shown in FIG. 10, the terminal device may further include:

a printed circuit board;

a flexible circuit board 1009 connected to the second screen assembly 1003, and parallel to the drive assembly 1004;

a connection assembly 1010 connected to the flexible circuit board 1009 and the printed circuit board respectively, for outputting control signals of the printed circuit board to the flexible circuit board 1009;

wherein the flexible circuit board 1009 is configured to control the image displayed by the second screen assembly 1003 as the image that is not displayed by the first screen assembly 1001 at the first opening 1001*a*, based on the control signals.

It may be needed to note that the flexible circuit board 1009 has a characteristic of good bending property. When the second screen assembly 1003 is moved from the first position to the second position, the flexible circuit board 1009 can be bent from a first state to a second state. That is, the flexible circuit board 1009 can change current bending state according to current position of the second screen assembly 1003 to meet different needs, so as to provide more flexibility for designing the elements on the printed circuit board.

In an embodiment, the terminal device may further include:

a transparent assembly covering a display surface of the first screen assembly 1001, through which the first opening 1001*a* can be shown.

Illustratively, the transparent assembly may be an assembly formed of glass material.

It could be understood that, by disposing the transparent assembly on the display surface, on the one hand, damage possibility of the first screen can be decreased, thereby extending usage time of the first screen assembly, and on the other hand, probability of the second screen assembly and the image collecting assembly in the terminal device exposed to environment can be reduced, which is beneficial to improve waterproof and dustproof effects of the terminal device.

It may be needed to note that "first" and "second" in the embodiments of the present disclosure are merely for convenience of expression and distinction, without other specific meanings.

Figure 11:
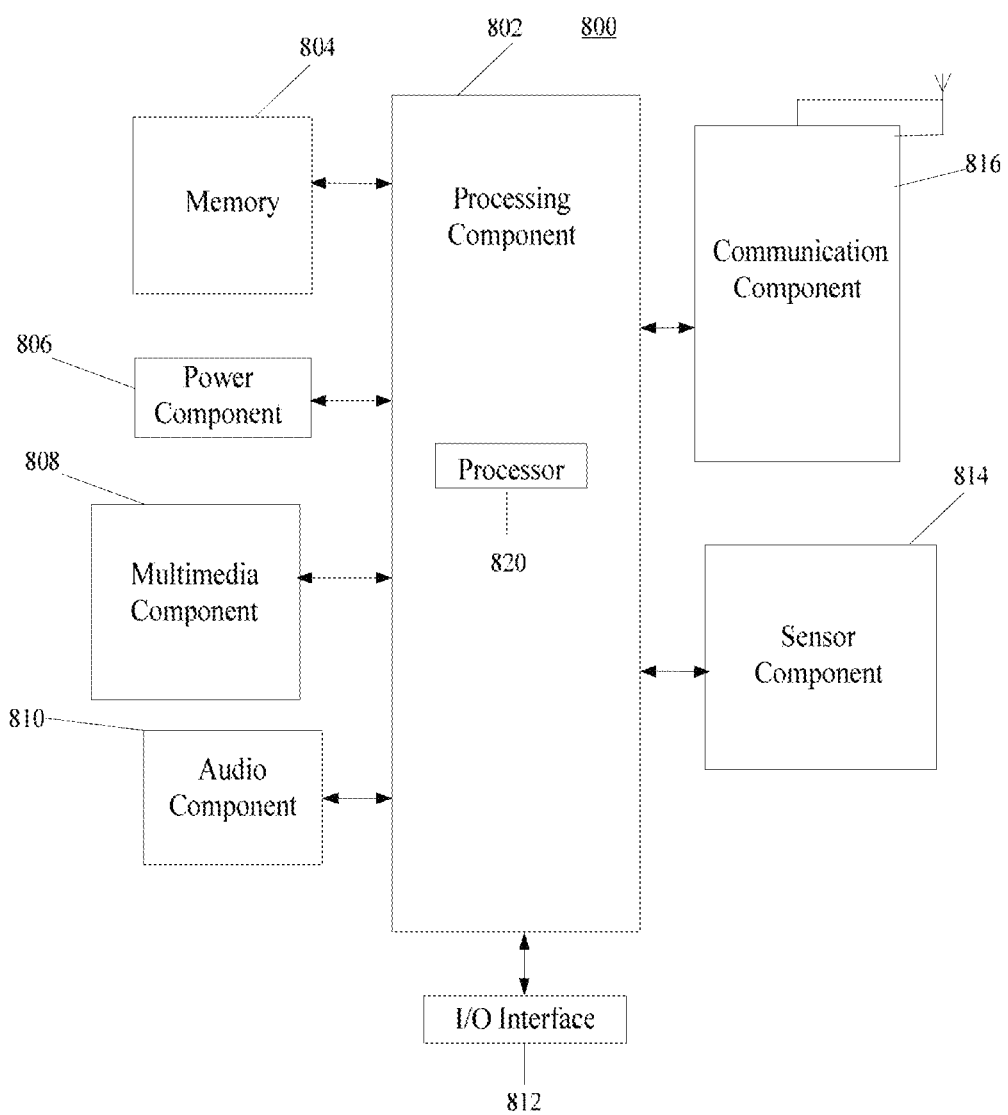
FIG. 11 is a fourteenth schematic view showing configuration of a terminal device according to an exemplary embodiment.

FIG. 11 is a block diagram of a terminal device 800, according to an exemplary embodiment. For example, the terminal device 800 may be a mobile phone, a computer, a digital broadcast terminal, a messaging apparatus, a game console, a tablet apparatus, a medical apparatus, a fitness apparatus, a personal digital assistant, and the like.

Referring to FIG. 11, the terminal device 800 may comprise one or more of the following components: a processing component 802, a memory 804, a power component 806, a multimedia component 808, an audio component 810, an input/output (I/O) interface 812, a sensor component 814, and a communication component 816.

The processing component 802 typically controls overall operation of terminal device 800, such as operations associated with display, telephone calls, data communications, camera operations, and recording operations. The processing component 802 may comprise one or more processors 820 to execute instructions to perform all or part of the steps in the above described methods. Moreover, the processing component 802 may include one or more modules which facilitate the interaction between the processing component 802 and other components. For example, the processing component 802 may include a multimedia module to facilitate interaction between the multimedia component 808 and the processing component 802.

The memory 804 is configured to store various types of data to support operations at the terminal device 800. Examples of such data include instructions for any application or method operating on the terminal device 800, contact data, phone book data, messages, pictures, videos, and the like. The memory 804 may be implemented by any type of volatile or non-volatile storage apparatus, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the terminal device 800. The power component 806 may comprise a power management system, one or more power sources, and other components associated with the generation, management, and distribution of power for terminal device 800.

The multimedia component 808 includes a screen that provides an output interface between the terminal device 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may sense not only a boundary of a touch or a sliding action, but also duration and pressure associated with the touch or sliding action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input an audio signal.

For example, the audio component 810 includes a microphone (MIC) that is configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker for outputting an audio signal.

The I/O interface 812 provides an interface between the processing component 802 and a peripheral interface module, which may be a keyboard, a click wheel, buttons, or the like. These buttons may include, but are not limited to, a home button, a volume button, a start button, and a lock button.

The sensor component 814 includes one or more sensors for providing the terminal device 800 with a status assessment in various aspects. For example, the sensor component 814 may detect an on/off state of the terminal device 800, a relative positioning of components, such as the display and the keypad of the terminal device 800, and the sensor component 814 may also detect change of a position of the terminal device 800 or an component of the terminal device 800, presence or absence of contacting of the user with the terminal device 800, an orientation or acceleration/deceleration of the terminal device 800, and temperature change of the terminal device 800. The sensor component 814 may include a proximity sensor configured to detect presence of nearby objects without any physical contact. The sensor component 814 may also include an optical sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate wired or wireless communication between the terminal device 800 and other apparatus. The terminal device 800 is capable of accessing a wireless network based on a communication standard such as Wi-Fi, 2G or 3G, or a combination thereof. In an exemplary embodiment, the communication component 816 receives broadcast signals or broadcast associated information from an external broadcast management system via a broadcast channel. In an exemplary embodiment, the communication component 816 further includes a near field communication (NFC) module to facilitate short range communication. For example, the NFC module may be implemented based on radio frequency identification (RFID) technology, infrared data association (IrDA) technology, ultra-wideband (UWB) technology, Bluetooth (BT) technology, and other technologies.

In an exemplary embodiment, the terminal device 800 may be implemented by one or more application specific integrated circuits (ASICs), digital signal processors (DSPs), digital signal processing devices (DSPDs), programmable logic devices (PLDs), A gated arrays (FPGAs), controllers, microcontroller, microprocessors, or other electronic components, for performing the above methods.

In an exemplary embodiment, there is also provided a non-transitory computer-readable storage medium comprising instructions, such as included in the memory 804, executable by the processor 820 in the terminal device 800, for performing the above-described methods. For example, the non-transitory computer-readable storage medium may be a ROM, a random access memory (RAM), a CD-ROM, a magnetic tape, a floppy disk, an optical data storage apparatus, and the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims

The invention claimed is:

1. A terminal device, comprising:
a first screen assembly configured to display an image, and having a first opening;
an image collecting assembly, disposed under the first screen assembly, and configured to collect an image based on external light when the first opening is not shielded;
a second screen assembly configured to display an image and shield the first opening, and movably disposed between the first screen assembly and the image collecting assembly; and
a driving assembly configured to drive the second screen assembly to move between a first position and a second position,
wherein when the second screen assembly is in the first position and the first opening is shielded, the second screen assembly is in a display state configured to display an image which is not displayed at the first opening in the first screen assembly, thereby forming a complete image with the image displayed by the first screen assembly; and
wherein when the second screen assembly is moved to the second position, the first opening is not shielded, thereby the image collecting assembly is capable of collecting the image based on the external light.

2. The terminal device of claim 1, wherein the drive assembly comprises:
a motor; and
a rotation assembly coupled to the motor and configured to rotate about a rotational axis to drive the second screen assembly to move between the first position and the second position by means of the motor.

3. The terminal device according to claim 2, further comprising:
a first connection slot connected to the second screen assembly;
wherein the rotation assembly is configured to pass through the first connection slot, and drive the second screen assembly to move through the first connection slot.

4. The terminal device according to claim 1, further comprising:
a movement path stop assembly, having a first stop module and a second stop module disposed opposite to the first stop module, wherein the second screen assembly is located at the first position when it is in contact with the first stop module, and the second screen assembly is located at the second position when it is in contact with the second stop module;
a rotation assembly, located on the movement path stop assembly, and capable of driving the second screen assembly to move between the first stop module and the second stop module by rotation thereof relative to the movement path stop assembly.

5. The terminal device according to claim 4, further comprising:
a guiding assembly fixedly coupled to the movement path stop assembly for guiding the second screen assembly to move between the first position and the second position along a setting direction of the second screen assembly.

6. The terminal device according to claim 5, further comprising:
a second connection slot connected to the second screen assembly;
wherein the guiding assembly is configured to pass through the second connection slot to guide the second screen assembly to move in the setting direction of the second screen assembly.

7. The terminal device according to claim 4, further comprising a casing in a shape of rectangle;
wherein both the first stop module and the second stop module are disposed in the casing and parallel to a short side of the casing.

8. The terminal device of claim 1, further comprising:
a printed circuit board;
a flexible circuit board connected to the second screen assembly and parallel to the drive assembly;
a connection assembly connected to the flexible circuit board and the printed circuit board respectively, for outputting control signals of the printed circuit board to the flexible circuit board;
wherein the flexible circuit board is configured to control the image displayed by the second screen assembly as the image that is not displayed by the first screen assembly at the first opening, based on the control signals.

9. The terminal device according to claim 1, further comprising a casing in a shape of rectangle;
wherein the second screen assembly is located within the casing;
wherein the driving assembly is configured to drive the second screen assembly to move in a direction along a long side of the casing.

10. The terminal device of claim 1, further comprising:
a transparent assembly covering a display surface of the first screen assembly, through which the first opening can be shown.

11. The terminal device of claim 1, wherein the terminal device is configured to have the image collecting assembly smoothly complete an image collection without occupying a display area of the terminal device, thereby increasing a screen-to-body ratio and improving user experience.

12. The terminal device of claim 11, wherein when the user does not need the image collecting assembly to generate an image, the second screen assembly is driven to move to the first position, and the image displayed by the second screen assembly and the image displayed by the first screen assembly constitute the complete image.

13. The terminal device of claim 12, wherein the terminal device is configured to, through adjusting position of the second screen assembly:
  facilitate the user taking a selfie image by exposing the image collecting assembly; and
  realize a full-screen display with the second screen assembly making up the first opening when the user desires a normal display.

14. The final device of claim 13, wherein the terminal device is a mobile phone.

15. The terminal device of claim 14, wherein the first screen assembly comprises an organic light-emitting diode (OLED) display.

16. The terminal device of claim 15, further comprising a microphone and a speaker.

17. A display method implemented by the terminal device according to claim 1, the method comprising:
  upon a user selecting a function of collecting an image, driving the second screen assembly to move to the second position; and
  collecting, with the image collecting assembly, the image through the first opening.

18. The display method of claim 17, wherein the image collecting assembly is configured to smoothly complete an image collection without occupying a display area of the terminal device, thereby increasing a screen-to-body ratio and improving user experience.

19. The display method of claim 18, wherein when the function of collecting the image is not selected, the method further comprises driving the second screen assembly to move to the first position; and wherein the image displayed by the second screen assembly and the image displayed by the first screen assembly constitute a complete image.

20. The display method of claim 19, wherein by adjusting position of the second screen assembly, in a case that the user needs to take a selfie, the image collecting assembly may be exposed to realize the selfie, and in a case that the user needs a normal display, the second screen assembly may be used to make up the first opening, so as to achieve visually a full-screen display.

* * * * *